(12) United States Patent
Chen

(10) Patent No.: US 9,782,614 B2
(45) Date of Patent: Oct. 10, 2017

(54) CONCEALED FIRE SPRINKLER

(71) Applicant: PROTECTOR SAFETY IND., LTD., Taoyuan County (TW)

(72) Inventor: Jung-Wen Chen, Taoyuan County (TW)

(73) Assignee: PROTECTOR SAFETY IND., LTD., Taoyuan County (TW)

( * ) Notice: Subject to any disclaimer, the term of this patent is extended or adjusted under 35 U.S.C. 154(b) by 140 days.

(21) Appl. No.: 14/939,250

(22) Filed: Nov. 12, 2015

(65) Prior Publication Data

US 2017/0095683 A1 Apr. 6, 2017

(30) Foreign Application Priority Data

Oct. 6, 2015 (TW) .............................. 104215989 U

(51) Int. Cl.
| A62C 37/08 | (2006.01) |
| A62C 35/68 | (2006.01) |
| B05B 15/06 | (2006.01) |
| B05B 1/26 | (2006.01) |
| F16F 1/32 | (2006.01) |
| A62C 37/12 | (2006.01) |
| A62C 31/02 | (2006.01) |
| B05B 1/28 | (2006.01) |

(52) U.S. Cl.
CPC .............. *A62C 35/68* (2013.01); *A62C 31/02* (2013.01); *A62C 37/12* (2013.01); *B05B 1/265* (2013.01); *B05B 1/28* (2013.01); *B05B 15/06* (2013.01); *F16F 1/322* (2013.01)

(58) Field of Classification Search
CPC ......... A62C 31/02; A62C 37/12; A62C 35/68; B05B 1/365; B05B 15/06; B05B 1/28; B05B 1/265; F16F 1/322
USPC ..... 169/37, 38, 41, 42; 239/208, 288–288.5; 267/159
See application file for complete search history.

(56) References Cited

U.S. PATENT DOCUMENTS

| 6,082,463 | A  * | 7/2000 | Ponte ..................... | A62C 37/09 169/41 |
| 6,374,919 | B1 * | 4/2002 | Neill ..................... | A62C 37/09 169/37 |
| 7,543,654 | B2 * | 6/2009 | Koiwa ................... | A62C 37/12 169/37 |
| 8,695,719 | B2 * | 4/2014 | Retzloff ................. | A62C 37/09 169/37 |
| 8,794,340 | B2 * | 8/2014 | Rekeny ................... | F16F 1/025 169/38 |

* cited by examiner

*Primary Examiner* — Steven J Ganey
(74) *Attorney, Agent, or Firm* — Chun-Ming Shih

(57) ABSTRACT

A concealed fire sprinkler includes a main body, an arm extending along the main body and a receiving slot formed on the arm. A bottom cover is fixed by the arm at bottom of the main body. An elastic component is received in the receiving slot. Two ends of the elastic component contact with the arm and the bottom cover. Accordingly, the conventional problems that the temperature sensing speed of concealed fire sprinklers is not capable of increasing rapidly can be solved.

6 Claims, 2 Drawing Sheets

CONCEALED FIRE SPRINKLER

BACKGROUND OF THE INVENTION

1. Field of the Invention

The present invention relates to a concealed fire sprinkler structural technique, particularly to a sprinkling body of a concealed fire sprinkler.

2. Description of Related Art

The conventional fire sprinklers are substantially divided into concealed-type, semi-concealed-type and open-type fire sprinklers. For the concealed-type fire sprinklers, the sprinkling head and its connected pipes are concealed in the ceiling in order to show the sprinkling body.

Conventional sprinkling body of the fire sprinkler comprises a main body and a bottom cover. The main body is disposed on the fire sprinkling head through the main body to fix the bottom cover to a lower part of the main body and to avoid direct exposing of sprinkling head from the surface of the ceiling so as to increase beauty of the whole ceiling. In the implementation of one embodiment of prior arts, the bottom cover is fixed to a lower part of the main body by adherence by using a low temperature melting metal (for example, Tin). When fire generates high temperature air to melt the low temperature melting metal, the bottom cover drops from the main body. Thus, hot air enters into the main body to cause a temperature sensing glass rod in sprinkling head to be cracked down and the water passage of the fire sprinkler pipe is opened to spray water.

Moreover, in the process of hot melting of the low temperature melting metal, an adhereing force of the bottom cover to fix to the main body bottom is decreased, the bottom cover will not drop from the lower part of the main body until the adhereing force is smaller than the dropping force of the bottom cover so as to let the hot air enter into the main body and to crack down the temperature sensing glass rod by heating. Thus, the sprinkling pipes are opened to spay water in order to decrease the damages of fire incident. But, how to increase the speed to drop the bottom cover from the lower part of the main body will be a technology subject to be studied and overcome.

SUMMARY OF THE INVENTION

The objective of the present invention is to improve the speed to drop the bottom cover from the lower part of the main body for a conventional concealed fire sprinkler under the hard condition that a temperature sensing speed of the temperature sensing glass rod is difficult to change. In order to achieve the objective, this invention provides a concealed fire sprinkler comprising:

a main body having an arm extending from it, the arm having a receiving slot;

a bottom cover fixed to a lower part of the arm through the arm; and an elastic component received in the receiving slot, two ends of the elastic component being respectively contacted with the arm and the bottom cover.

In one preferred embodiment of the present invention, a preferably manifold sheet is formed and extending from one end of the arm, a bonding element is formed at a lower side of the manifold sheet and the receiving slot is formed between the manifold sheet and the bonding element.

According to the present invention, preferably two ends of the elastic element respectively contact with the manifold sheet and the bottom cover.

According to the present invention, preferably the elastic element is a spring sheet in V-shape. A bending portion is preferably formed between the two ends of the elastic element and the bending portion is received in the receiving slot so as to respectively contact the two ends with the arm and the bottom cover.

According to the above techniques of this invention, the advantages of the present invention are that the dropping force of the bottom cover by means of the elastic component located between the main body and the bottom cover is increased by using a pushing force of the elastic component in addition to the effects of the dropping force of the bottom cover weight, and that the speed to drop the bottom cover from the lower part of the main body is increased when the low temperature melting metal melts down to cause the adhering force to bond the bottom cover to decrease. The sprinkling pipes are opened to extinguish the fire. The convenience to assemble the elastic component between the main body and the bottom cover is increased through the V-shaped structure of the elastic component.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
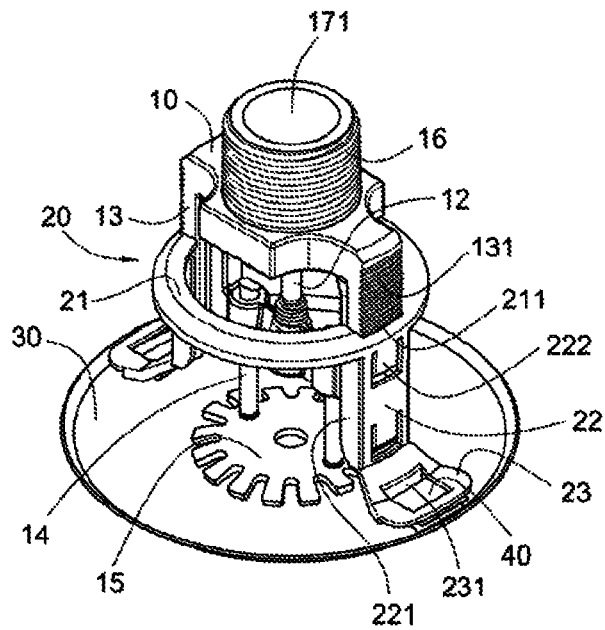
FIG. 1 is a three-dimensional explosive view of a concealed fire sprinkler of the present invention.
Figure 2:
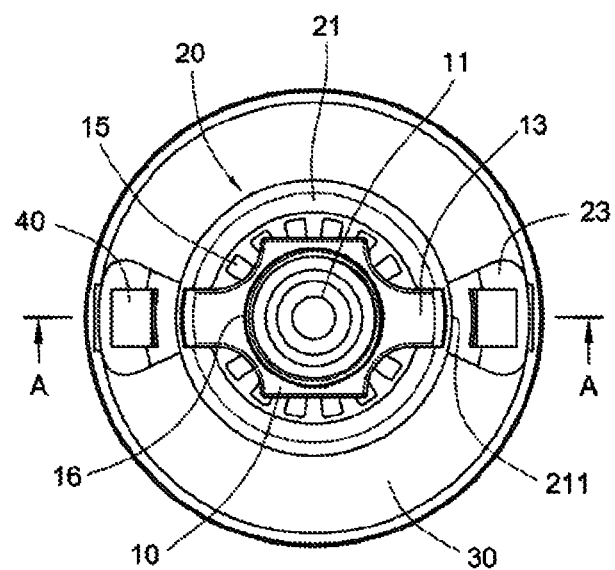
FIG. 2 is a top view showing the concealed fire sprinkler of FIG. 1 of the present invention.
Figure 3:
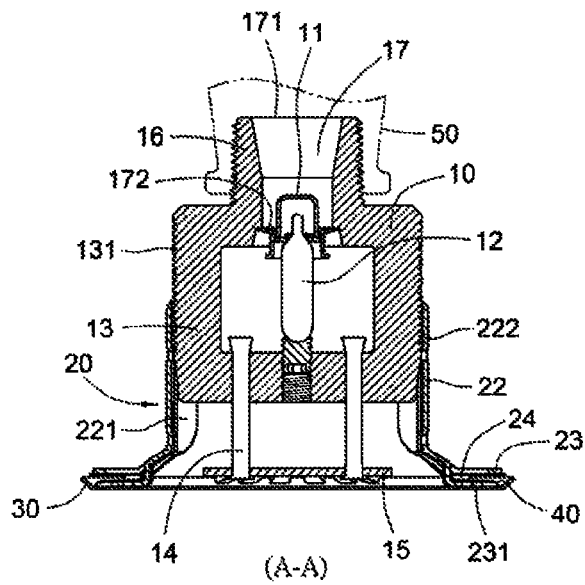
FIG. 3 is a cross-section view along a line A-A of FIG. 2.

Please refer to FIGS. 1 to 3 which respectively disclose a preferred embodiment of the present invention. The disclosed concealed fire sprinkler in the present invention comprises a main body 20, a bottom cover 30 and an elastic component 40.

The main body 20 is mounted on the sprinkler 20. In more details, a sprinkling head comprises a valve seat 10. A screw component 16 is formed on a top end of the valve seat 10. The valve seat 10 can be mounted on a fire pipe 50 by the screw component 16. A passage 17 is formed in the valve sear 10. At two ends of passage 17, a water inlet 171 and a valve hole 172 are respectively formed on a surface of the valve seat 10. The passage 17 is fluidly connected to the fire pipe 50 through water inlet 171 so that the water in the fire pipe 50 can transfer from the passage 17 to the valve hole 172 via the water inlet 171 to drain out. In one embodiment, a water valve 11 is disposed at the valve seat 10. The water valve 11 can control a draining timing of the water in the fire pipe 50. A temperature sensing glass rod 12 is disposed under the bottom of the water valve 11. The temperature sensing glass rod 12 normally pushes upwardly to hold the water valve 11 to turn off the valve hole 172 to prevent the water in the fire pipe 50 from leakage to the outside.

Two ribs 13 are respectively formed at opposite axial sides of the passage at two ends of the valve seat 10. The rib 13 is used for holding and positioning the temperature sensing glass rod 12 to maintain in the valve seat 10. A guiding rod 14 which can move and slide in an axial direction of passage 17 is formed at a bottom side of the rib 13. A disk-shaped spoiler 15 which can form a water curtain from the water drained from the valve hole 172 by the spoiler 15 is connected to the guiding rod 14 in order to enhance a spraying area of the water.

In one embodiment, the main body 20 is held and maintained at the ribs 13 at two sides of the valve seat 10. In more details, a ring-shaped neck 21 is formed at a top side of the main body 20. An assembling slot 211 is formed in an asymmetric way at the neck 21. An inner diameter of the neck 21 is smaller than an outer diameter of the valve seat 10 and an inner diameter between two assembling slots 211 is larger than the outer diameter of the valve seat 10 in order to restrict an assembling way of the valve seat 10 and the main body 20 for facilitating mounting of the main body 20 on the fastened ribs 13 at two sides of the valve seat 10.

In one embodiment, an arm 22 is formed and extending along a wall of the main body 20 at an outside of the assembling slot 211. Because the arm 22 in this invention is used for guiding movement of the main body 20 along an axial direction of the valve seat 10, the amount of the arms 22 should be larger or equal to the amount of the ribs 144. In this embodiment, the amount of the arms 22 is two. Furthermore, a guiding sheet 221 is respectively formed by folding the guiding sheet 221 at two sides of the arms 22. The main body 20 can move along a formed guiding slot in a limited axial direction of the valve seat 10 through the guiding sheets 221. A plurality of elastic hooks 222 are formed on the arms 22 between two guiding sheets 221. The elastic hooks 22 are made by punching an outer wall of the arm 22 in one embodiment. One end of the elastic hook 222 is bending inwardly and the elastic hook 222 is formed in an array on the arm 22. A plurality of fastening slots 131 are formed at equal distance on the rib 13. The fastening slot 131 is in tooth-shaped in implementation. The elastic hook 222 can be fastened by being hooked to the fastening slot 131 for facilitating regulating a level of the fastening position of the main body 20 on the valve seat 10.

A manifold sheet 23 is formed and extending in a horizontal direction of the arm 22. A bonding element 231 is formed at bottom of the manifold sheet 23. The bonding element 231 is made by punching a sheet of the manifold sheet 23. The bonding element 231 is in L-shape. A receiving slot 24 is formed between the bonding element 231 and the manifold sheet 23.

In one embodiment, the bottom cover 30 is fixed to the bottom of the main body 20. In more details, the bottom cover 30 is adhered and fixed to bonding element 231 at bottom of the main body 20 by using a low temperature melting metal (for example, tin) for adhering. When high temperature of the hot air of a fire causes the low temperature melting metal to melt down so as to drop the bottom cover 30 from the main body 20, the hot air contacts with the temperature sensing glass rod 12 to be cracked down in order to open the water valve 11 to spray water.

Figure 4:
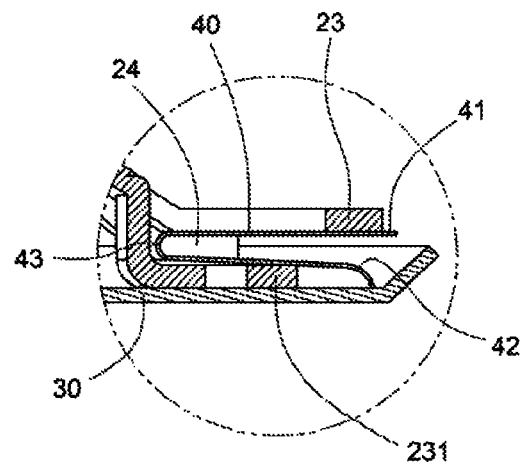
FIG. 4 is a partially enlarged view showing the concealed fire sprinkler of FIG. 3 of the invention.

Please refer to FIGS. 3 and 4 which demonstrate that the elastic component 40 is disposed between the main body 20 and the bottom cover 30. Two ends of the elastic component 40 respectively contact with the main body 20 and the bottom cover 30. In one embodiment, the elastic component 40 is a V-shaped elastic sheet. In implementation, the two ends of the elastic component 40 respectively are a first terminal 41 and a second terminal 42. A bending portion 43 is formed between the first terminal 41 and the second terminal 42 of the elastic component 40 to show that the appearance of the elastic component 40 is of V-shape.

When the elastic component 40 is assembled between the main body 20 and the bottom cover 30, the elastic component 40 is implanted into the receiving slot 24 by firstly inserting the bending portion 43, secondly the first terminal 41 and thirdly the second terminal 42. Thus, the elastic component 40 is continuously pressed so that the first terminal 41 mutually approaches the second terminal 42 of the elastic component 40 by confining of the receiving slot 24. Thus, the second terminal 42 of the elastic component 40 leaves the bottom cover 30 to avoid retarding assemble of the bottom cover 30 on bottom of the main body 20 and to increase convenience of assemble of the elastic component 40. When the bottom cover 30 is fixed to the bottom of the main body 20 by using the low temperature melting metal, pressing toward the elastic component 40 is terminated so that the first terminal 41 leaves away the second terminal 42 from each other through spring pressure of the elastic component 40. Then, the first terminal 41 of the elastic component 40 contacts the manifold sheet 23 and the second terminal 42 contacts the bottom cover 30. A dropping force of the bottom cover 30 increases after the spring pressure of the elastic component 40 pushes the bottom cover 30. When hot air melts down the low temperature melting metal to decrease the adhering force of the bottom cover 30, the bottom cover 30 can fast drop from the bottom of the main body 20 for facilitating turning on the water valve 11 to spray water.

Although the present invention has been explained in relation to its preferred embodiment, it is to be understood that any other possible modifications and variations can be made without departing from the scope of the invention as hereinafter claimed.

I claim:

1. A concealed fire sprinkler comprising:
   a main body having an arm extending therefrom, the arm having a receiving slot;
   a bottom cover fixed to a lower part of the arm through the arm; and
   an elastic component received in the receiving slot, two ends of the elastic component being respectively contacted with the arm and the bottom cover,
   wherein a manifold sheet is formed and extending from one end of the arm, a bonding element is formed at a lower side of the manifold sheet and the receiving slot is formed between the manifold sheet and the bonding element.

2. The concealed fire sprinkler as claimed in claim 1, wherein two ends of the elastic component respectively contact with the manifold sheet and the bottom cover.

3. The concealed fire sprinkler as claimed in claim 1, wherein the elastic component is a spring sheet in V-shape.

4. A concealed fire sprinkler comprising:
   a main body having an arm extending therefrom, the arm having a receiving slot;
   a bottom cover fixed to a lower part of the arm through the arm; and
   an elastic component received in the receiving slot, two ends of the elastic component being respectively contacted with the arm and the bottom cover,
   wherein the elastic component is a spring sheet in V-shape;
   wherein a bending portion is formed between the two ends of the elastic component and the bending portion is received in the receiving slot so as to respectively contact the two ends with the arm and the bottom cover.

5. The concealed fire sprinkler as claimed in claim 4, wherein a manifold sheet is formed and extending from one end of the arm, a bonding element is formed at a lower side of the manifold sheet and the receiving slot is formed between the manifold sheet and the bonding element.

6. The concealed fire sprinkler as claimed in claim 5, wherein two ends of the elastic component respectively contact with the manifold sheet and the bottom cover.

\* \* \* \* \*